United States Patent
Mittal et al.

(10) Patent No.: US 10,579,427 B2
(45) Date of Patent: Mar. 3, 2020

(54) METHOD AND SYSTEM FOR TRANSLATING RESOURCE REQUIREMENT OF APPLICATION INTO TANGIBLE INFRASTRUCTURAL RESOURCES

(71) Applicant: DATERA, INC., Sunnyvale, CA (US)

(72) Inventors: Shailesh Mittal, Santa Clara, CA (US); Ashok Rajagopalan, Fremont, CA (US); Raghu Krishnamurthy, Santa Clara, CA (US)

( * ) Notice: Subject to any disclaimer, the term of this patent is extended or adjusted under 35 U.S.C. 154(b) by 215 days.

(21) Appl. No.: 15/422,374

(22) Filed: Feb. 1, 2017

(65) Prior Publication Data

US 2018/0217866 A1   Aug. 2, 2018

(51) Int. Cl.
G06F 9/46  (2006.01)
G06F 9/50  (2006.01)

(52) U.S. Cl.
CPC ................. G06F 9/5011 (2013.01)

(58) Field of Classification Search
CPC ..................................................... G06F 9/52
USPC ........................................................ 718/104
See application file for complete search history.

(56) References Cited

U.S. PATENT DOCUMENTS

| | | | | | |
|---|---|---|---|---|---|
| 5,873,097 | A * | 2/1999 | Harris | ............... | G06F 17/30348 |
| 6,769,124 | B1 * | 7/2004 | Schoening | ............ | G06F 9/4493 |
| | | | | | 719/316 |
| 7,685,178 | B2 * | 3/2010 | Rajan | ................... | G06F 3/0607 |
| | | | | | 707/802 |
| 7,930,476 | B1 * | 4/2011 | Castelli | ................ | G06F 9/5016 |
| | | | | | 709/225 |
| 2003/0069916 | A1 * | 4/2003 | Hirschsohn | ........... | G06F 9/5016 |
| | | | | | 718/104 |
| 2004/0267807 | A1 * | 12/2004 | Barabas | ............ | G06F 17/30362 |
| 2005/0026654 | A1 * | 2/2005 | Perez | ................... | G06F 9/5027 |
| | | | | | 455/556.2 |
| 2005/0027863 | A1 * | 2/2005 | Talwar | ................. | G06F 9/5072 |
| | | | | | 709/226 |
| 2006/0136701 | A1 * | 6/2006 | Dickinson | ................ | G06F 8/61 |
| | | | | | 712/205 |
| 2010/0175063 | A1 * | 7/2010 | Ciano | .................. | G06F 9/4862 |
| | | | | | 718/1 |
| 2012/0185441 | A1 * | 7/2012 | Sankar | ............... | G06F 11/3495 |
| | | | | | 707/687 |
| 2014/0096129 | A1 * | 4/2014 | Kimmet | .................... | G06F 8/61 |
| | | | | | 717/177 |

(Continued)

*Primary Examiner* — Mehran Kamran
(74) *Attorney, Agent, or Firm* — Barry Choobin; Patent 360

(57) ABSTRACT

A method and a system for translating a resource requirement associated with an application into one or more tangible infrastructural resources in a communication network is disclosed. The method includes receiving a request for the resource requirement associated with the application. The method includes creating in response to the received request, an application compose requirement file based on an application definition and the resource requirement. The method includes translating the resource requirement associated with the application into the one or more tangible infrastructural resources based on the created application compose requirement file. The method includes providing the one or more tangible infrastructural resources to the application based on the translated resource requirement.

7 Claims, 4 Drawing Sheets

(56) References Cited

U.S. PATENT DOCUMENTS

| | | | |
|---|---|---|---|
| 2014/0160990 A1* | 6/2014 | Sachdev | H04W 24/02 370/259 |
| 2015/0113149 A1* | 4/2015 | Gan | H04L 47/70 709/226 |
| 2015/0277974 A1* | 10/2015 | Beale | G06F 9/4856 714/19 |
| 2016/0050275 A1* | 2/2016 | Santry | G06F 11/1464 709/219 |
| 2016/0080479 A1* | 3/2016 | Zhang | H04L 67/10 709/217 |
| 2016/0094483 A1* | 3/2016 | Johnston | H04L 47/827 709/226 |
| 2016/0210173 A1* | 7/2016 | Bookman | H04L 67/06 |
| 2016/0344771 A1* | 11/2016 | Xuan | H04L 63/20 |
| 2017/0123812 A1* | 5/2017 | Voigt | G06F 9/4401 |
| 2018/0004456 A1* | 1/2018 | Talwar | G06F 3/0611 |

* cited by examiner

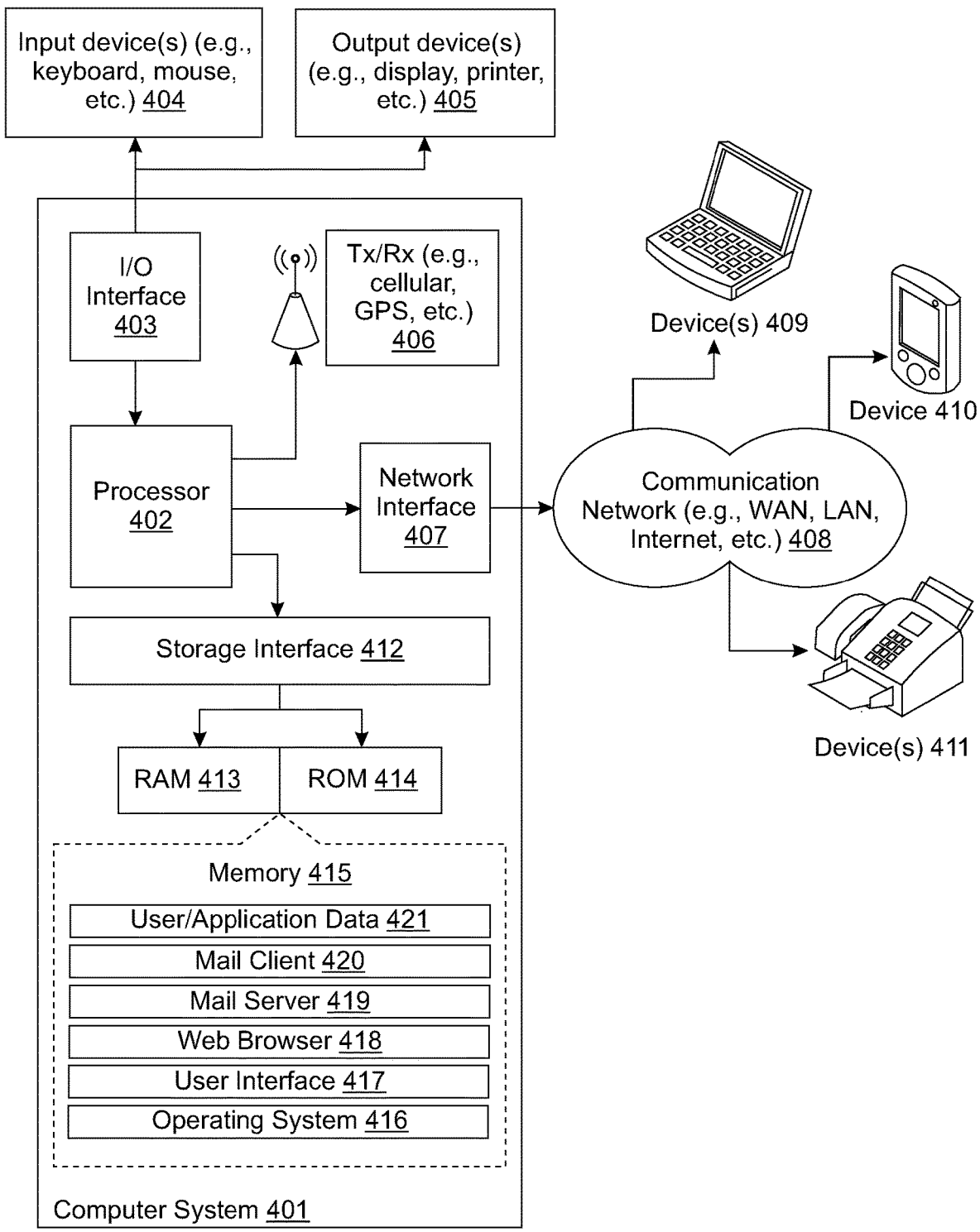
FIG. 4 Example Computer System

METHOD AND SYSTEM FOR TRANSLATING RESOURCE REQUIREMENT OF APPLICATION INTO TANGIBLE INFRASTRUCTURAL RESOURCES

TECHNICAL FIELD

The presently disclosed embodiments are related, in general, to provisioning infrastructural resources. More particularly, the presently disclosed embodiments are related to methods and systems for translating a resource requirement associated with an application into one or more tangible infrastructural resources.

BACKGROUND

Traditionally, for running an application hosted in a virtual environment or a physical environment, the user is responsible for managing the infrastructural resources required for managing the application. Thus, conventionally the application is not aware about the infrastructural resource requirement associated with the application. Further, the burden for determining the infrastructural resource requirement associated with the application is on the user managing the application. The user managing the application must have the technical know-how and expertise to determine the appropriate infrastructural resource requirement so that the application may run without any latency.

However, there is no guarantee that the infrastructural resource requirement predicted by the user is correct and would ensure smooth running of the application. Currently, there is no mechanism for translating a resource requirement associated with an application into one or more tangible infrastructural resources without the intervention of the user. Usually, the user has a high-level knowledge of the resource requirement for the application but translating such a requirement to one or more tangible infrastructural resources is a challenge rooted in computer technology. Thus, there is need for a mechanism for translating a resource requirement associated with an application into one or more tangible infrastructural resources.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for translating a resource requirement associated with an application into one or more tangible infrastructural resources. The method includes receiving a request for the resource requirement associated with the application. The method includes creating in response to the received request, an application compose requirement file based on an application definition and the resource requirement. The method includes translating the resource requirement associated with the application into the one or more tangible infrastructural resources based on the created application compose requirement file by a resource engine. The method includes providing the one or more tangible infrastructural resources to the application based on the translated resource requirement.

According to embodiments illustrated herein, there may be provided a system that includes an application server configured to translate a resource requirement associated with an application into one or more tangible infrastructural resources. The application server may further include one or more processors configured to receive a request for the resource requirement associated with the application. The application server may further include one or more processors configured to create in response to the received request, an application compose requirement file based on an application definition and the resource requirement. The application server may further include one or more processors configured to translate the resource requirement associated with the application into the one or more tangible infrastructural resources based on the created application compose requirement file through a resource engine. The application server may further include one or more processors configured to provide the one or more tangible infrastructural resources to the application based on the translated resource requirement.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 4 illustrates a block diagram of an exemplary computer system for implementing embodiments consistent with the present disclosure.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
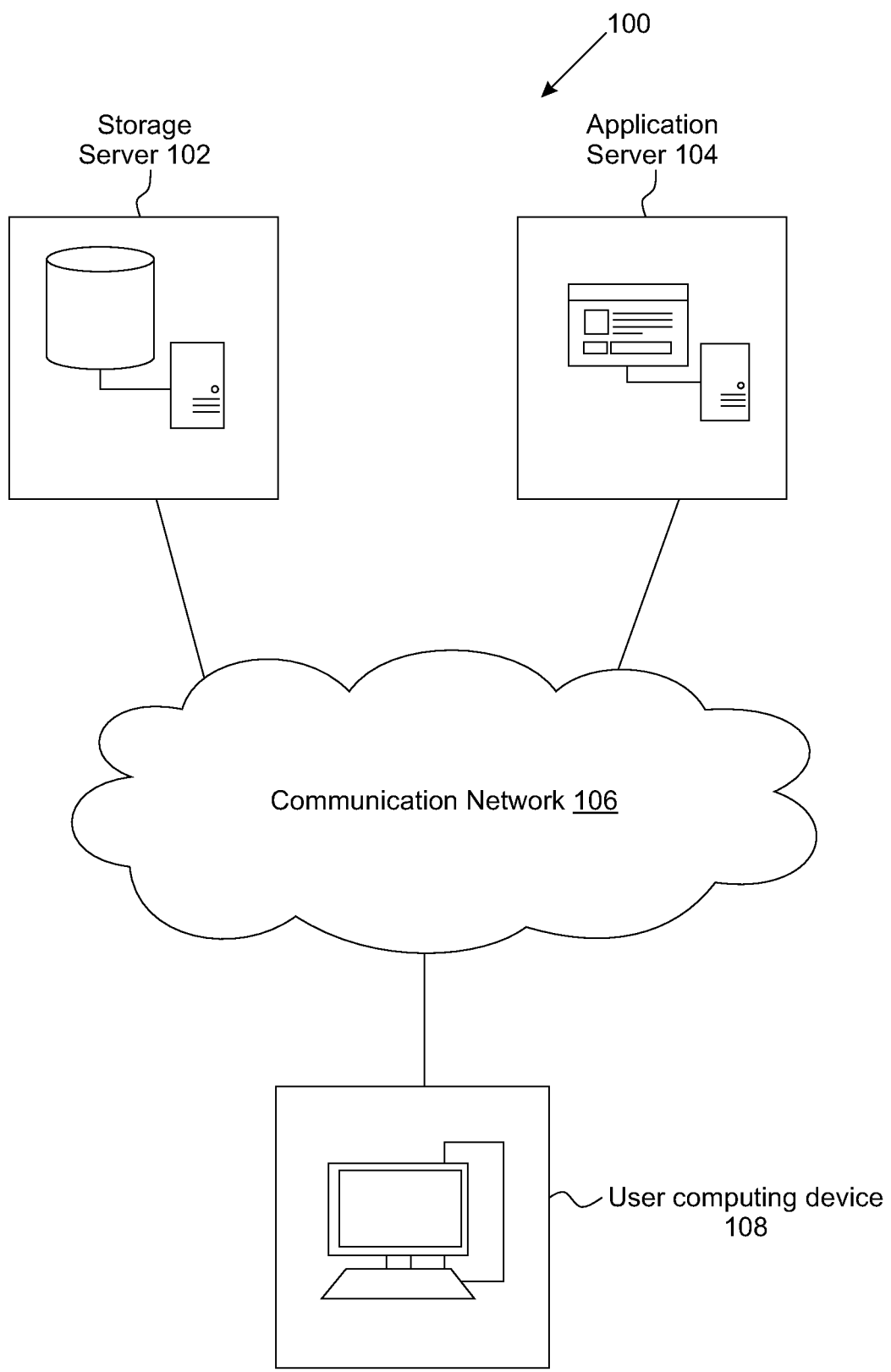
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a storage server 102, an application server 104, a communication network 106, and a user computing device 108 that may be associated with a user (not shown). The storage server 102, the application server 104, and the user computing device 108 may be communicatively coupled with each other via the communication network 106. In an embodiment, the application server 104 may communicate with the storage server 102 using one or more protocols such as, but not limited to, Open Database Connectivity (ODBC) protocol and Java Database Connectivity (JDBC) protocol. In an embodiment, the user computing device 108 may communicate with the application server 104, via the communication network 106. The application (not shown) may be hosted within the user computing device 108. In an embodiment, the application may be hosted within a virtual environment or a physical environment of the user computing device 108.

In an embodiment, the storage server 102 may refer to a computing device that may be configured to provision one or more tangible infrastructural resources for running an application. In an embodiment, the storage server 102 may include a special purpose operating system specifically configured to perform one or more database operations on the multimedia content. Examples of database operations may include, but are not limited to, Select, Insert, Update, and Delete. In an embodiment, the storage server 102 may include hardware that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

A person with ordinary skills in the art will understand that the scope of the disclosure is not limited to the storage server 102 as a separate entity. In an embodiment, the functionalities of the storage server 102 can be integrated into the application server 104.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

In an embodiment, the application server 104 may be configured to receive a request for the resource requirement associated with the application. In an embodiment, the application server 104 may be configured to create in response to the received request an application compose requirement file based on an application definition and the resource requirement. In an embodiment, the application server 104 may be configured to translate the resource requirement associated with the application into the one or more tangible infrastructural resources based on the created application compose requirement file. In an embodiment, the application server 104 may be configured to provide the one or more tangible infrastructural resources to the application based on the translated resource requirement.

A person having ordinary skill in the art will appreciate that the scope of the disclosure is not limited to realizing the application server 104 and the user computing device 108 as separate entities. In an embodiment, the application server 104 may be realized as an application program installed on and/or running on the user computing device 108 without departing from the scope of the disclosure.

In an embodiment, the communication network 106 may correspond to a communication medium through which the storage server 102, the application server 104, and the user computing device 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user computing device 108 may refer to a computing device used by the one or more users. The user computing device 108 may comprise of one or more processors and one or more memories. The one or more memories may include computer readable code that may be executable by the one or more processors to perform predetermined operations. In an embodiment, the user computing device 108 may present a user-interface, to provide a request to the application server 104 for the resource requirement associated with the application. Examples of the one or more mobile devices 108 may include, but are not limited to, a personal computer, a laptop, a personal digital assistant (PDA), a mobile device, a tablet, or any other computing device.

Figure 2:
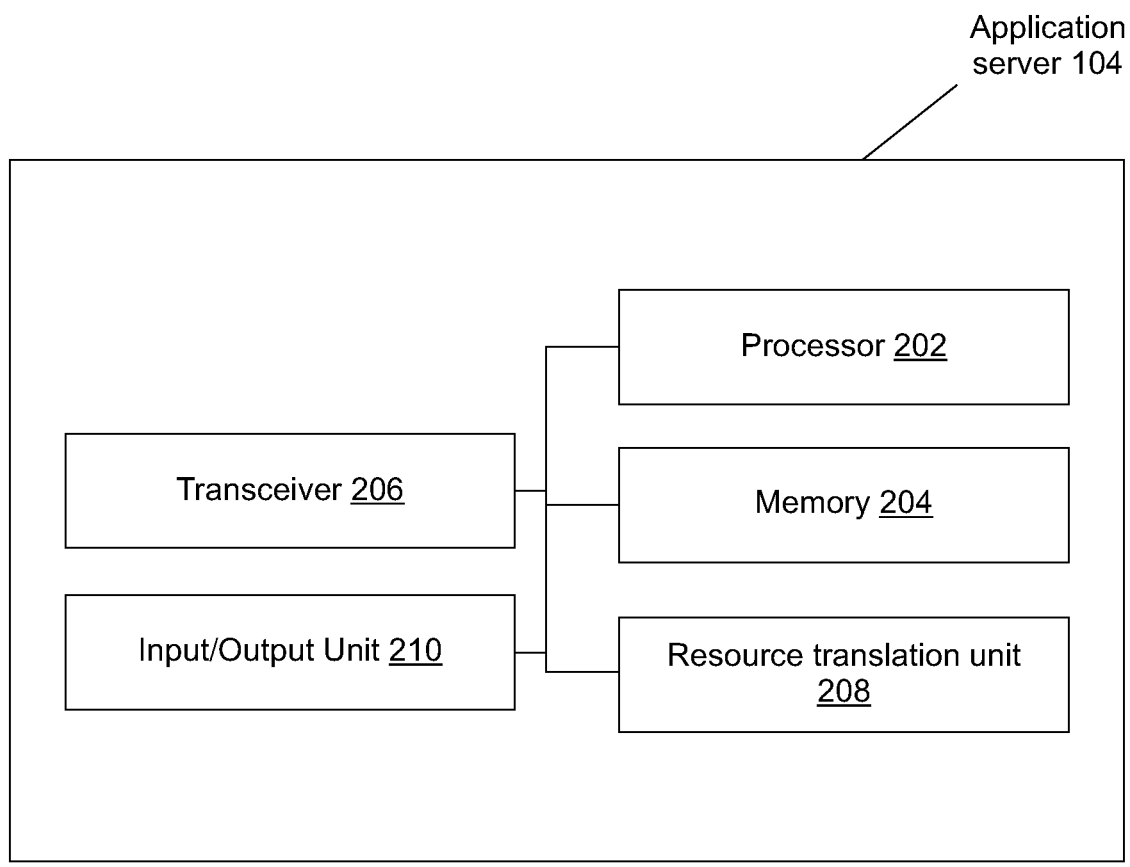
FIG. 2 is a block diagram that illustrates an application server configured translating a resource requirement associated with an application into one or more tangible infrastructural resources, in accordance with at least one embodiment.

FIG. 2 is a block diagram that illustrates an application server 104 configured for translating a resource requirement associated with an application into one or more tangible infrastructural resources, in accordance with at least one embodiment. FIG. 2 is explained in conjunction with elements from FIG. 1. In an embodiment, the application server 104 includes a processor 202, a memory 204, a transceiver 206, a resource translation unit 208, and an input/output unit 210. The processor 202 may be communicatively coupled to the memory 204, the transceiver 206, the resource translation unit 208, and the input/output unit 210. The transceiver 206 may be communicatively coupled to the communication network 106.

The processor 202 comprises suitable logic, circuitry, interfaces, and/or code that may be configured to execute a set of instructions stored in the memory 204. The processor 202 may be implemented based on several processor technologies known in the art. The processor 202 works in coordination with the transceiver 206, the resource translation unit 208, and the input/output unit 210 for translating a resource requirement associated with an application into one or more tangible infrastructural resources. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that are executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that may be configured to receive a request for the resource requirement associated with the application, via the communication network 106. The transceiver 206 may be further configured to transmit a request to storage server to provision one or more tangible infrastructural resources for the application based on translated resource requirement and the hint, via the communication network 106. The transceiver 206 may be further configured to receive a handle to provision the one or more tangible infrastructural resources for the application, via the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The resource translation unit 208 comprises suitable logic, circuitry, interfaces, and/or code that may be configured to create in response to the received request an application compose requirement file based on an application definition and the resource requirement. The resource translation unit 208 may be further configured to translate the resource requirement associated with the application into the one or more tangible infrastructural resources based on the created application compose requirement file. The resource translation unit 208 may be further configured to provide the one or more tangible infrastructural resources to the application based on the translated resource requirement.

The input/output unit 210 comprises suitable logic, circuitry, interfaces, and/or code that may be configured to provide one or more inputs to the application server 104 during the translation of a resource requirement associated with an application into one or more tangible infrastructural resources. The input/output unit 210 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 works in coordination with the transceiver 206, the resource translation unit 208, and the input/output unit 210 for translating a resource requirement associated with an application into one or more tangible infrastructural resources. An application hosted within the user computing device 108 may be configured to transmit a request for provisioning one or more tangible infrastructural resources required for running the application.

The transceiver 206 may be configured to receive the request for the resource requirement associated with the application. In an embodiment, the application may be hosted in a virtual environment or a physical machine environment. In an embodiment, the application corresponds to a container in the virtual environment. In an embodiment, the request may further comprise one or more labels and application definitions. In an embodiment, the one or more labels describe a higher level resource requirement of the application and the application definitions comprise details of the resource requirement associated with the application.

For example, the label may be GOLD or PLATINUM. Each of the labels indicate a higher level resource requirement of the application. In an embodiment, the application definitions may elaborate in detail the resource requirement of the application for each label. For example, the application definition of the label GOLD may include IOPS: 10 k, hard disk capacity: 1 TB, latency: 1 ms, and bandwidth: 300 MB. For example, the application definition of the label PLATINUM may include IOPS: 30 k, hard disk capacity: 12 TB, latency: 0.5 ms, and bandwidth: 900 MB.

In response to the received request, the resource translation unit 208 may be configured to create an application compose requirement file based on the application definitions and the resource requirement. In an embodiment, the application compose requirement file may comprise details of the one or more labels and the application definitions. After creation of the application compose requirement file, the resource translation unit 208 may be configured to translate the resource requirement associated with the application into the one or more tangible infrastructural resources based on the created application compose requirement file.

In an embodiment, for achieving the translation, the resource translation unit 208 may be configured to retrieve one or more labels from the received request or the created application compose requirement file. In an embodiment, the one or more labels may describe a higher level resource requirement of the application. Further, the resource translation unit 208 may be configured to map the retrieved one or more labels to the one or more tangible infrastructural resources based on the application compose requirement file and the retrieved one or more labels. Based on the mapping, the resource translation unit 208 may be configured to provide a hint to the storage server 102. In an embodiment, the hint may correspond to the one or more tangible infrastructural resources required by the application.

After translating the resource requirement associated with the application into the one or more tangible infrastructural resources based on the hint, the transceiver 206 may be configured to transmit a request to the storage server 102 to provision one or more tangible infrastructural resources for the application based on translated resource requirement and the hint. In response to the received request, the storage engine of the storage server may be configured to provision one or more tangible infrastructural resources for the application. In an embodiment, the storage server 102 may provide a handle to provision the one or more tangible infrastructural resources for the application.

Based on the received handle from the storage server 102, the resource translation unit 208 may provide a mount point for the one or more tangible infrastructural resources for the application. Thus, the resource translation unit 208 may provide one or more tangible infrastructural resources to the application based on the translated resource requirement. In an embodiment, the one or more tangible infrastructural resources corresponds to memory, computational power, and storage space. After the one or more tangible infrastructural resources are provided, the application may consume the provided one or more tangible infrastructural resources.

A person skilled in the art will understand that the scope of the disclosure should not be limited to creation of the dynamic schedule based on the aforementioned factors and using the aforementioned techniques. Further, the examples provided in supra are for illustrative purposes and should not be construed to limit the scope of the disclosure.

Figure 3:
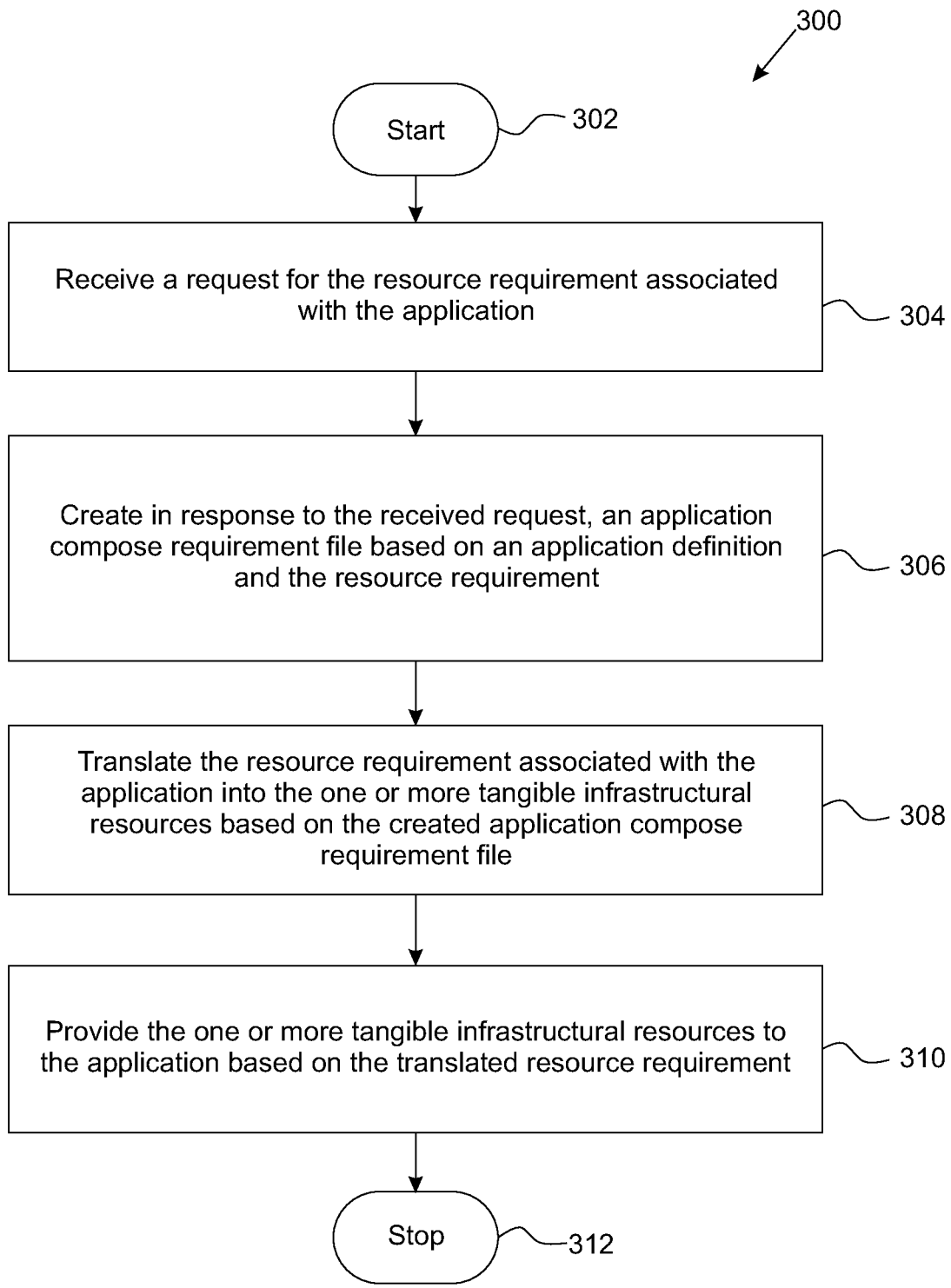
FIG. 3 is a flowchart that illustrates a method for translating a resource requirement associated with an application into one or more tangible infrastructural resources, in accordance with at least one embodiment.

FIG. 3 is a flowchart that illustrates a method for translating a resource requirement associated with an application into one or more tangible infrastructural resources, in accordance with at least one embodiment. The flowchart 300 is described in conjunction with FIG. 1 and FIG. 2. The method starts at step 302.

At step 304, the application server may be configured to receive a request for the resource requirement associated with the application. At step 306, the application server may be configured to create in response to the received request, an application compose requirement file based on an application definition and the resource requirement. At step 308, the application server may be configured to translate the resource requirement associated with the application into the one or more tangible infrastructural resources based on the created application compose requirement file. At step 310, the application server may be configured to provide the one or more tangible infrastructural resources to the application based on the translated resource requirement. Control passes to end step 314.

Computer System

FIG. 4 illustrates a block diagram of an exemplary computer system for implementing embodiments consistent with the present disclosure. Variations of computer system 401 may be used for performing optical character recognition on an image including a plurality of printed characters. The computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various embodiments of the disclosure encompass numerous advantages including methods and systems for translating a resource requirement associated with an application into one or more tangible infrastructural resources. In an embodiment, the methods and systems may be utilized to eliminate the need of a user to have the technical know-how and expertise to determine the appropriate infrastructural resource requirement so that the application may run without any latency. Further, the translated the resource requirement associated with the application into the one or more tangible infrastructural resources based on the created application compose requirement file will ensure that the application runs smoothly without any latency. Further the disclosed method and system provides a mechanism for translating a resource requirement associated with an application into one or more tangible infrastructural resources without the intervention of the user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

We claim:

1. A method for translating a resource requirement associated with an application into one or more tangible infrastructural resources in a communication network, the method comprising:
   receiving, by an application server, a request for the resource requirement associated with the application, wherein the request comprises one or more labels that describe a higher level resource requirement of the application;
   creating, by the application server, in response to the received request, an application compose requirement file based on an application definition and the resource requirement;
   translating by a resource engine, at the application server, the resource requirement associated with the application into the one or more tangible infrastructural resources based on the created application compose requirement file, wherein the application is hosted in a virtual environment or a physical machine environment, wherein the application corresponds to a container in the virtual environment, wherein translating the resource requirement further comprises:
      retrieving the one or more labels from the received request;
      mapping the retrieved one or more labels to the one or more tangible infrastructural resources based on the application compose requirement file; and
      providing a hint based on the mapping, wherein the hint corresponds to the one or more tangible infrastructural resources required by the application; and
   providing, by the application server, the one or more tangible infrastructural resources to the application based on the translated resource requirement, wherein the one or more tangible infrastructural resources are provided to the application based on a handle which provides a mount point for the one or more tangible infrastructural resources for the application.

2. The method of claim 1, wherein one or more tangible infrastructural resources corresponds to memory, computational power, and storage space.

3. An application server to translate a resource requirement associated with an application into one or more tangible infrastructural resources, the application server comprising:
   a processor; and
   a memory communicatively coupled to the processor, wherein the memory stores processor instructions, which, on execution, causes the processor to:
   receive a request for the resource requirement associated with the application;
   create in response to the received request, an application compose requirement file based on an application definition and the resource requirement;
   translate the resource requirement associated with the application into the one or more tangible infrastructural resources based on the created application compose requirement file through a resource engine, wherein the application is hosted in a virtual environment or a physical machine environment, wherein the application corresponds to a container in the virtual environment, wherein translating the resource requirement through the resource engine further comprises:
      retrieving the one or more labels from the application;
      mapping the retrieved one or more labels to the one or more tangible infrastructural resources based on the application compose requirement file; and
      providing a hint based on the mapping, wherein the hint corresponds to the one or more tangible infrastructural resources required by the application; and
   provide the one or more tangible infrastructural resources to the application based on the translated resource requirement.

4. The application server of claim 3, wherein the one or more tangible infrastructural resources corresponds to memory, computational power, and storage space.

5. A non-transitory computer readable storage medium including instructions that, when executed by a processing unit, cause the processing unit to perform operations comprising:
   receiving a request for the resource requirement associated with the application;
   creating in response to the received request, an application compose requirement file based on an application definition and the resource requirement;
   translating the resource requirement associated with the application into the one or more tangible infrastructural resources based on the created application compose requirement file through a resource engine, wherein the application is hosted in a virtual environment or a physical machine environment, wherein the application corresponds to a container in the virtual environment, wherein translating the resource requirement comprises:
      retrieving the one or more labels from the application;
      mapping the retrieved one or more labels to the one or more tangible infrastructural resources based on the application compose requirement file; and
      providing a hint based on the mapping, wherein the hint corresponds to the one or more tangible infrastructural resources required by the application; and
   providing the one or more tangible infrastructural resources to the application based on the translated resource requirement.

6. The non-transitory computer-readable storage medium according to claim 5 wherein translating the resource requirement comprises:
   retrieving the one or more labels from the application;
   mapping the retrieved one or more labels to the one or more tangible infrastructural resources based on the application compose requirement file; and
   providing a hint based on the mapping, wherein the hint corresponds to the one or more tangible infrastructural resources required by the application.

7. The non-transitory computer-readable storage medium according to claim 5, wherein the one or more tangible infrastructural resources corresponds to memory, computational power, and storage space.

* * * * *